(12) United States Patent
Ishii et al.

(10) Patent No.: US 12,208,343 B2
(45) Date of Patent: Jan. 28, 2025

(54) ANALYSIS METHOD

(71) Applicant: Nippon Telegraph and Telephone Corporation, Tokyo (JP)

(72) Inventors: Azusa Ishii, Tokyo (JP); Takashi Miwa, Tokyo (JP); Masamitsu Watanabe, Tokyo (JP); Soichi Oka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 473 days.

(21) Appl. No.: 17/620,530

(22) PCT Filed: Jun. 24, 2019

(86) PCT No.: PCT/JP2019/024900
§ 371 (c)(1),
(2) Date: Dec. 17, 2021

(87) PCT Pub. No.: WO2020/261321
PCT Pub. Date: Dec. 30, 2020

(65) Prior Publication Data
US 2022/0266171 A1    Aug. 25, 2022

(51) Int. Cl.
*B01D 15/34*    (2006.01)
*G01N 30/74*    (2006.01)
*G01N 30/78*    (2006.01)
*G01N 30/86*    (2006.01)

(52) U.S. Cl.
CPC ............. *B01D 15/34* (2013.01); *G01N 30/74* (2013.01); *G01N 30/78* (2013.01); *G01N 30/8668* (2013.01); *G01N 30/8672* (2013.01)

(58) Field of Classification Search
CPC ........ B01D 15/34; G01N 30/74; G01N 30/78; G01N 30/8668; G01N 30/8672; G01N 2030/047; G01N 30/04
See application file for complete search history.

(56) References Cited

FOREIGN PATENT DOCUMENTS

JP    H09281097 A  *  4/1996

OTHER PUBLICATIONS

Trathnigg, B., "Size-Exclusion Chromatography of Polymers," Encyclopedia of Analytical Chemistry, R.A. Meyers (Ed.), 2000, 28 pages.

* cited by examiner

*Primary Examiner* — Waqaas Ali
(74) *Attorney, Agent, or Firm* — Slater Matsil, LLP

(57) ABSTRACT

A first chromatogram is obtained by analyzing a second standard sample by size exclusion chromatography analysis using a first detector. Also, a second chromatogram is obtained by analyzing a solvent for the second standard sample by size exclusion chromatography analysis using the first detector. Then, from the difference between the first chromatogram and the second chromatogram, a third elution time in size exclusion chromatography analysis of the second standard sample using the first detector is determined.

12 Claims, 2 Drawing Sheets

ANALYSIS METHOD

This patent application is a national phase filing under section 371 of PCT/JP2019/024900, filed on Jun. 24, 2019, which application is hereby incorporated herein by reference.

TECHNICAL FIELD

The present invention relates to an analytical method using size exclusion chromatography.

BACKGROUND

For analysis of polymeric materials and the like, size exclusion chromatography is used (see Non-Patent Literature 1). Size exclusion chromatography is a method for separating and purifying an analytical sample by utilizing the fact that the time required for molecules to pass through a column differs depending on their sizes. In the analysis using size exclusion chromatography, as in other types of chromatography, a detector is placed at the outlet of the column, and a substance that has passed through the column is detected by the detector and output as a signal (chromatogram) corresponding to the concentration of that substance.

As is well known, the chromatogram output from the detector is a graph with the time axis on the horizontal axis and the detection intensity on the vertical axis, where the detection intensity rises from the start of detection, reaches the maximum value at a certain time point, then declines, and reaches zero at a certain time point, marking the end of detection. Based on the time from the introduction of the substance to be analyzed into the column until the appearance of the maximum value (peak) in the chromatogram (elution time or retention time), it is possible to qualify the substance to be measured. In addition, based on the height of the peak, it is possible to quantify the substance to be measured.

In the analysis by size exclusion chromatography, the molecular weight (molecular weight distribution) of the subject to be measured can be analyzed based on the elution time. When performing the analysis by size exclusion chromatography, standard samples with known molecular weights are used, and the relationships between elution times and molecular weights are obtained by measuring a plurality of standard samples each having a different molecular weight. Based on the relationships thus obtained, a calibration curve showing the relationships between elution times and molecular weights is created. Note that the calibration curve may also be referred to as a working curve or standard curve. In general, a calibration curve using coordinates with the elution time on the horizontal axis and the logarithm of the molecular weight on the vertical axis is created. In the actual analysis, the elution time on the horizontal axis of the obtained chromatogram is converted into the logarithm of the molecular weight using the calibration curve, resulting in a graph showing the molecular weight distribution.

By using the size exclusion chromatography mentioned above, the molecular weight distribution of a synthetic polymer, which is a mixture of molecules with different molecular weights, can be analyzed. In this analysis, a differential refractometer (refractive index (RI) detector) and an ultraviolet absorption detector (ultraviolet (UV) detector) are used as the detectors.

It is desirable that the standard samples used for the calibration curve mentioned above should have a molecular structure similar to that of the sample (polymer) to be measured. However, since the types of commercially available standard samples are limited, when it is difficult to acquire standard samples with the same molecular structure as that of the subject to be measured, substances that are soluble in the measurement solvent are selected for use from among those generally used as standard substances, such as polystyrene (PS), polymethyl methacrylate (PMMA), and polyethylene oxide (PEO).

For example, when the sample is polyethylene terephthalate (PET), HFIP (1,1,1,3,3,3-hexafluoro-2-propanol), which can dissolve PET, is used as the measurement solvent. Also, in the measurement system using HFIP as the solvent, PMMA is generally used as the standard substance due to its solubility in HFIP (see Non-Patent Literature 1). Since PMMA is difficult to be detected by a UV detector, an RI detector is used as the detector.

An RI detector is most generally used in the analysis by size exclusion chromatography and can detect most compounds, but it has disadvantages such as low detection sensitivity, susceptibility to the influence of ambient temperature, and thus low stability. By contrast, a UV detector has high detection sensitivity and also has high stability, but it can only be utilized for samples with ultraviolet absorption. Even when the subject to be measured is a substance with ultraviolet absorption, such as PET, if the standard sample is a substance with no ultraviolet absorption, such as PMMA, a UV detector cannot be applied in the creation of the calibration curve, and an RI detector is used.

As mentioned above, when multiple detectors are used, the RI detector is used at first for a plurality of standard samples using PMMA as the standard substance, thereby obtaining a plurality of standard elution times for the case of using the RI detector. Next, analysis using a standard substance that can be detected by both RI detector and UV detector is carried out once, and the difference $\Delta T$ between the elution time in the case of using the RI detector and the elution time in the case of using the UV detector is determined. In this analysis, the RI detector and the UV detector are connected in series on the outlet side of the column. By using the $\Delta T$ thus determined, the aforementioned plurality of standard elution times are converted into a plurality of standard elution times for the case of using the UV detector. The plurality of standard elution times thus converted are used to create a converted calibration curve for the case of using the UV detector.

Next, by using the converted calibration curve created as mentioned above, the analysis of PET using size exclusion chromatography is performed using the RI detector, and the elution time on the horizontal axis of the obtained chromatogram is converted into the logarithm of the molecular weight using the converted calibration curve, resulting in a graph showing the molecular weight distribution.

CITATION LIST

Non-Patent Literature

Non-Patent Literature 1: B. Trathnigg, "Size-exclusion Chromatography of Polymers", Encyclopedia of Analytical Chemistry, R. A. Meyers (Ed.), pp. 8008-8034, John Wiley & Sons Ltd, Chichester, 2000.

SUMMARY

Technical Problem

However, the molecular weight distribution analysis of polymeric materials by size exclusion chromatography mentioned above has the following problem. As mentioned earlier, when the ΔT is determined using a standard substance that can be detected by both RI detector and UV detector, the ΔT is supposed to be consistent even when the standard samples have different average molecular weights. However, the ΔT was sometimes found to differ when the standard substances had different average molecular weights. As stated above, in the measurement system where different average molecular weights of the standard substances result in different ΔT, it is considered that an accurate calibration curve cannot be obtained and correct analysis results (molecular weight distribution) cannot be obtained.

Embodiments of the present invention have been made to solve the problem as described above, and an object the present invention is to make it possible to create an accurate calibration curve using multiple detectors in size exclusion chromatography.

Means for Solving the Problem

An analytical method according to embodiments of the present invention comprises the following steps: a first step of analyzing a plurality of first standard samples each having a different molecular weight by size exclusion chromatography analysis using a first detector, thereby obtaining a plurality of first elution times; a second step of analyzing a second standard sample by size exclusion chromatography analysis using the first detector, thereby obtaining a first chromatogram; a third step of analyzing a solvent for the second standard sample by size exclusion chromatography analysis using the first detector, thereby obtaining a second chromatogram; a fourth step of analyzing the second standard sample by size exclusion chromatography analysis using a second detector, thereby obtaining a second elution time; a fifth step of determining a third elution time in size exclusion chromatography analysis of the second standard sample using the first detector, from a difference between the first chromatogram and the second chromatogram; a sixth step of reflecting a difference between the second elution time and the third elution time in each of the plurality of first elution times, thereby determining a plurality of fourth elution times; a seventh step of creating a calibration curve showing a relationship between the plurality of fourth elution times and corresponding molecular weights; an eighth step of analyzing a substance to be measured by size exclusion chromatography analysis using the second detector, thereby obtaining a third chromatogram; and a ninth step of converting the third chromatogram using the calibration curve, thereby obtaining a molecular weight distribution of the substance.

In one configuration example of the analytical method described above, the first detector is a differential refractometer.

In one configuration example of the analytical method described above, the second standard sample has a ratio of a number average molecular weight to a weight average molecular weight of 1.30 or less.

In one configuration example of the analytical method described above, the second detector is an ultraviolet absorption detector.

Effects of Embodiments of the Invention

As described above, according to embodiments of the present invention, since the first chromatogram of the second standard sample is obtained using the first detector, the second chromatogram of the solvent for the second standard sample is obtained using the first detector, and the third elution time of the second standard sample using the first detector is determined from the difference between the first chromatogram and the second chromatogram, an accurate calibration curve can be created using multiple detectors in size exclusion chromatography.

DETAILED DESCRIPTION OF ILLUSTRATIVE EMBODIMENTS

Figure 1:
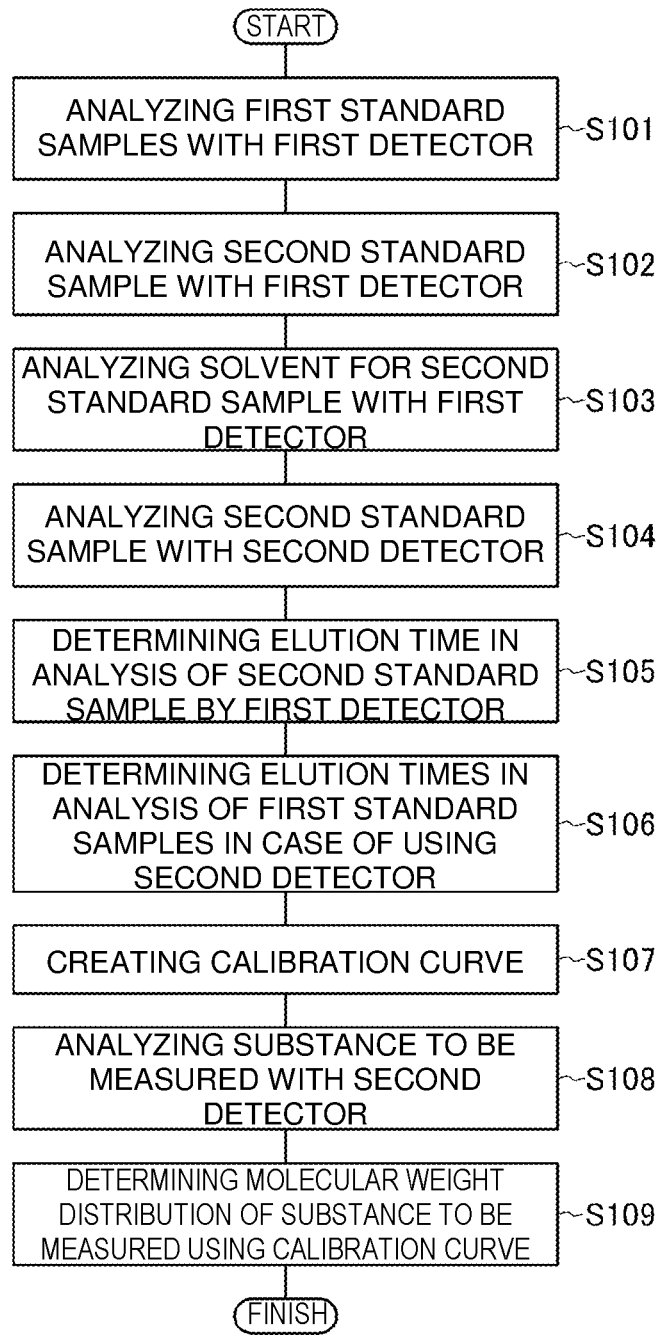
FIG. 1 is a flowchart for describing an analytical method according to an embodiment of the present invention.

Hereinafter, an analytical method according to an embodiment of the present invention will be described with reference to FIG. 1. Note that, in the analysis, the first detector and the second detector are connected in series for use on the outlet side of the column for size exclusion chromatography. This is a general device configuration for this type of analysis.

At first, in a first step S101, a plurality of first elution times $[T_A (ST_k)]$ are obtained by analyzing a plurality of first standard samples $(ST_k)$ each having a different molecular weight by size exclusion chromatography analysis using the first detector. The first standard samples are, for example, polymethyl methacrylate (PMMA) standard samples. The first detector is, for example, a differential refractometer (refractive index (RI) detector).

Next, in a second step S102, a first chromatogram $[F_{Sk} (T_A)]$ is obtained by analyzing a second standard sample $(S_k)$ by size exclusion chromatography analysis using the first detector. The second standard sample is, for example, polyethylene terephthalate.

Next, in a third step S103, a second chromatogram $[F_{blank} (T_A)]$ is obtained by analyzing a solvent for the second standard sample by size exclusion chromatography analysis using the first detector. The solvent for the second standard sample is, for example, 1,1,1,3,3,3-hexafluoro-2-propanol containing sodium trifluoroacetate.

Next, in a fourth step S104, a second elution time $[T_B (S_k)]$ is obtained by analyzing the second standard sample by size exclusion chromatography analysis using a second detector. The second detector is, for example, an ultraviolet absorption detector (ultraviolet (UV) detector).

Next, in a fifth step S105, from the difference $[F_{Sk} (T_A) - F_{blank} (T_A)]$ between the first chromatogram $[F_{Sk} (T_A)]$ and the second chromatogram $[F_{blank} (T_A)]$, a third elution time $[T_A (S_k)]$ in size exclusion chromatography analysis of the second standard sample using the first detector is determined.

Next, in a sixth step S106, a plurality of fourth elution times $[T_B (ST_k)]$ is determined by reflecting the difference $[\Delta T (S_k) = T_B(S_k) - T_A (S_k)]$ between the second elution time $[T_B (S_k)]$ and the third elution time $[T_A (S_k)]$ in each of the plurality of first elution times $[T_A (ST_k)]$.

Next, in a seventh step S107, a calibration curve showing the relationship between the plurality of fourth elution times $[T_B (ST_k)]$ and corresponding molecular weights (M) is created (a calibration curve expression is calculated).

Next, in an eighth step S108, a third chromatogram is obtained by analyzing a substance to be measured by size exclusion chromatography analysis using the second detector.

Next, in a ninth step S109, the third chromatogram is converted using the calibration curve, thereby obtaining the molecular weight distribution of the substance.

According to the embodiment mentioned above, since the third elution time in size exclusion chromatography analysis of the second standard sample using the first detector is determined from the difference between the first chromatogram and the second chromatogram, fluctuations or the like in the detection results of the first detector due to the solvent for the second standard sample are removed. As a result, according to the above embodiment, an accurate calibration curve can be created using multiple detectors in size exclusion chromatography, and accurate analysis can be performed.

Hereinafter, how the present inventors have reached embodiments of the present invention will be described. As mentioned above, when using a standard substance that can be detected by both RI detector and UV detector to determine the difference $\Delta T$ between the elution time in the case of using the RI detector and the elution time in the case of using the UV detector, the $\Delta T$ was sometimes found to differ when the standard samples had different average molecular weights. As a result of diligent research on this phenomenon, the present inventors have found out that fluctuations (variations) occur in the measurement results of the RI detector and that this is caused by the solvent used for the measurement.

The RI detector measures the difference in refractive index (differential refractive index) between the solvent sealed in the reference cell and the solution in which the substance to be measured (polymeric material) is dissolved, flowing through the flow cell and eluted from the column. Here, when only the solvent was measured in the same way, a minor amount of gas, water, or the like included in the solvent was separated in the process of passing through the column, causing a slight change in the refractive index of the eluate, and the differential refractive index measured with the RI detector after passing through the column changed slightly depending on the samples. These fluctuations caused by the solvent appear as fluctuation in the chromatogram obtained from the measurement of the substance to be measured by the RI detector.

Since the fluctuations mentioned above are small compared to the change in refractive index due to the elution of the samples that have passed through the column, when the analysis of molecular weight distribution is performed only with the RI detector, such fluctuations have small influence on the approximate shape of the molecular weight distribution and the values of the number average molecular weight and weight average molecular weight, and thus hardly affect the analytical results.

However, as a result of diligent research by the present inventors, it has been found that, in order to determine the difference $\Delta T$ between the elution time in the case of using the RI detector and the elution time in the case of using the UV detector, it is necessary to accurately determine a single point, the peak value of each, and for this purpose, the fluctuations mentioned above cannot be ignored. In embodiments of the present invention, the influence of the fluctuations mentioned above is eliminated by subtracting the chromatogram of the solvent from the chromatogram of the substance to be measured dissolved in the solvent.

Next, more detailed description will be given using the results of experiments.

Measuring Device
    Device: An SEC device from Waters Corporation, AQUICTY APC.
    Columns: APC-XT, 186006995, 186006998, 186007003, and 186007254.

First Standard Samples
    Commercially available PMMA standard samples (six types with peak top molecular weights of 102500, 56900, 24400, 10900, 8350, and 4250) were used.

Second Standard Sample
    Polyethylene terephthalate.

In the experiments, nine types of polyethylene terephthalate with different peak top molecular weights Mp and weight average molecular weight/weight average molecular weight (Mw/Mn) were provided in order to check for fluctuations caused by the solvent (see Table 1). Note that it is desirable that the second standard sample should be a polymeric material with a molecular structure similar to that of the substance to be measured, but it is not necessary for their compositions to be completely identical.

TABLE 1

| | $S_1$ | $S_2$ | $S_3$ | $S_4$ | $S_5$ | $S_6$ | $S_7$ | $S_8$ | $S_9$ |
|---|---|---|---|---|---|---|---|---|---|
| Mp | 15000 | 15000 | 15000 | 15000 | 15000 | 30000 | 60000 | 8000 | 4000 |
| Mw/Mn | 1.5 | 1.30 | 1.20 | 1.10 | 1.05 | 1.05 | 1.05 | 1.05 | 1.05 |

Sample to be Measured
    Polyethylene terephthalate (molecular weight distribution unknown).

Preparation of Samples
    Each of the first standard samples, the second standard sample, and the sample to be measured was dissolved in 1,1,1,3,3,3-hexafluoro-2-propanol (HFIP) containing 5 mmol/L of sodium trifluoroacetate at 1 mg/1 mL. Each solution was placed in a sample bottle, each sample bottle was covered with a lid and left to stand overnight, and the solution was filtered through a PTFE syringe filter with a pore diameter of 0.2 µm into a vial for measurement.

Measurement Conditions
    Solvent: HFIP containing 5 mmol/L of sodium trifluoroacetate.
    Column temperature: 40° C.
    Flow rate: 0.25 mL/min.
    Sample concentration: 1 mg/mL.
    Injection volume: 0.2 µL/time
    Detectors: RI detector (40° C.) and UV detector (254 nm).

Size Exclusion Chromatography Analysis
    Analysis of the solvent, the first standard samples ($ST_k$), the second standard sample ($S_k$), and the sample to be measured was performed.

Calibration Curve
    From the analytical results of the first standard samples by the RI detector, a cubic calibration curve was created.

Experiment 1

The analysis of the solvent and $S_5$, $S_6$, $S_7$, $S_8$, and $S_9$ (second standard samples) shown in Table 1 was performed, and $\Delta T$ ($S_k$) was determined for each of them. The third elution time [$T_A$ ($S_k$)], the second elution time [$T_B$ ($S_k$)], the determined $\Delta T$ ($S_k$), and the RI detection output value $F_{blank}$ ($T_A$ ($S_k$)) at the third elution time [$T_A$ ($S_k$)] for the solvent analysis are shown in Table 2 below. Note that the Mp and Mw/Mn in the table are known values from separate measurements.

TABLE 2

| | $S_5$ | $S_6$ | $S_7$ | $S_8$ | $S_9$ |
|---|---|---|---|---|---|
| Mp | 15000 | 30000 | 60000 | 8000 | 4000 |
| Mw/Mn | 1.05 | 1.05 | 1.05 | 1.05 | 1.05 |
| $T_A(S_k)$ | 11.05 | 10.70 | 10.30 | 11.80 | 12.90 |
| $T_B(S_k)$ | 11.23 | 11.15 | 10.50 | 11.88 | 13.12 |
| $\Delta T(S_k)$ = $T_B(S_k)$ - $T_A(S_k)$ | 0.18 | 0.45 | 0.20 | 0.08 | 0.22 |
| $F_{blank}(T_A(S_k))$ | 0.02 | 0.22 | 0.01 | −0.13 | 0.03 |

For $S_5$, $S_7$, and $S_9$, $\Delta T$ ($S_k$) was approximately 0.20 and almost equal with each other, but for $S_6$ and $S_8$, $\Delta T$ ($S_k$) was far off from 0.20. Comparing $F_{blank}$ ($T_A$ ($S_k$)), it was found that $S_5$, $S_7$, and $S_9$, which had $\Delta T$ ($S_k$) of around 0.20, had $F_{blank}$ ($T_A$ ($S_k$)) of in the vicinity of zero, which was almost equal with each other, while $S_6$ and $S_8$, which had $\Delta T$ ($S_k$) of far off from 0.20, also had a value of $F_{blank}$ ($T_A$ ($S_k$)) off from 0 (the underlined numbers in the table). This is thought to be because, when the elution of $S_k$ reaches its maximum near the time zone where the baseline of the chromatogram by the RI detector was fluctuating in the solvent analysis, there was a gap between the time when the elution of $S_k$ actually reached its maximum and the time when the output of the RI detector reached its maximum. From the above, it was suggested that $\Delta T$ ($S_k$)=$T_B$ ($S_k$)-$T_A$ ($S_k$) may not indicate the true difference in elution time between the two detectors.

Experiment 2

First, the analysis of the solvent and the second standard sample shown in Table 1 were performed, and for each of them, the third elution time [$T_A$ ($S_k$)] in size exclusion chromatography analysis of the second standard sample using the RI detector was determined from $F_{Sk}$ ($T_A$)-$F_{blank}$ ($T_A$). $T_A$ ($S_k$) is the time when $F_{Sk}$ ($T_A$)-$F_{blank}$ ($T_A$) reaches its maximum. In addition, from the determined $T_A$ ($S_k$), $\Delta T$ ($S_k$)=$T_B$ ($S_k$)-$T_A$ ($S_k$) was determined. Each value determined is shown in Table 3 and Table 4 below. Note that the Mp and Mw/Mn in the table are known values from separate measurements. In addition, $S_5$ is repeatedly shown in Table 3 and Table 4.

TABLE 3

| | $S_1$ | $S_2$ | $S_3$ | $S_4$ | $S_5$ |
|---|---|---|---|---|---|
| Mp | 15000 | 15000 | 15000 | 15000 | 15000 |
| Mw/Mn | 1.5 | 1.30 | 1.20 | 1.10 | 1.05 |
| $T_a(S_k)$ | 10.97 | 11.00 | 11.05 | 11.04 | 11.03 |
| $T_B(S_k)$ | 11.23 | 11.23 | 11.23 | 11.23 | 11.23 |
| $\Delta T(S_k)$ = $T_B(S_k)$ - $T_a(S_k)$ | 0.26 | 0.23 | 0.18 | 0.19 | 0.20 |

TABLE 4

| | $S_5$ | $S_6$ | $S_7$ | $S_8$ | $S_9$ |
|---|---|---|---|---|---|
| Mp | 15000 | 30000 | 60000 | 8000 | 4000 |
| Mw/Mn | 1.05 | 1.05 | 1.05 | 1.05 | 1.05 |
| $T_a(S_k)$ | 11.03 | 10.93 | 10.31 | 11.70 | 12.91 |
| $T_B(S_k)$ | 11.23 | 11.15 | 10.50 | 11.88 | 13.12 |
| $\Delta T(S_k)$ = $T_B(S_k)$ - $T_a(S_k)$ | 0.20 | 0.22 | 0.19 | 0.18 | 0.21 |

For all of $S_5$, $S_6$, $S_7$, $S_8$, and $S_9$, $\Delta T$ ($S_k$) is approximately 0.20 and almost equal with each other, and the correction by $F_{Sk}$ ($T_A$)-$F_{blank}$ ($T_A$) is effective. Comparing the results of $S_1$, $S_2$, $S_3$, $S_4$, and $S_5$, as the Mw/Mn becomes larger, $\Delta T$ ($S_k$) tends to be further away from 0.20. Then, it was found that, for the sample: $S_k$ for calculating the elution time difference between the RI detector and the UV detector, (Mw/Mn) ≤1.30 is preferable, and (Mw/Mn)≤1.10 is more preferable.

Experiment 3

Next, Experiment 3 will be described. Note that the RI detector is defined as a detector A, and the UV detector is defined as a detector B.

Procedures

Step 1: A sample obtained by filtering the solvent used for the measurement (blank sample) was analyzed with the detector A, thereby obtaining the second chromatogram $F_{blank}$ ($T_A$).

Step 2: The first standard samples $ST_k$ (k=1, 2, 3, 4, 5, and 6) were analyzed with the detector A, and the first elution time $T_A$ ($ST_k$) for each of them was determined.

Step 3: The second standard sample $S_5$, which can be detected by both detector A and detector B, was analyzed, thereby obtaining the first chromatogram $F_{S5}$ ($T_A$).

Step 4: The sample X, which was the subject to be measured, was measured with the detector B.

Step 5: The time $T_A$ ($S_5$) at which the difference of $F_{S5}$ ($T_A$)-$F_{blank}$ ($T_A$) reached its maximum was determined, and it was found to be 11.03 min.

Step 6: The difference between $T_A$ ($S_5$)=11.03 min and the second elution time $T_B(S_k)$=11.23 min determined by size exclusion chromatography analysis of the second standard sample $S_5$ using the detector B was determined, and it was found that $\Delta T$ ($S_5$)=$T_B$ ($S_5$)-$T_A$ ($S_5$)=0.20 min.

Step 7: The first elution time $T_A$ ($ST_k$), which was the time of peak top obtained from the analysis of each of the first standard samples $ST_k$ (k=1, 2, 3, 4, 5, and 6) by the detector A, was converted into $T_B$ ($ST_k$) by using $\Delta T$ ($S_5$) of 0.20 min, and a calibration curve expression showing the correspondence relationship between $T_B$ and the molecular weight M was calculated.

Figure 2:
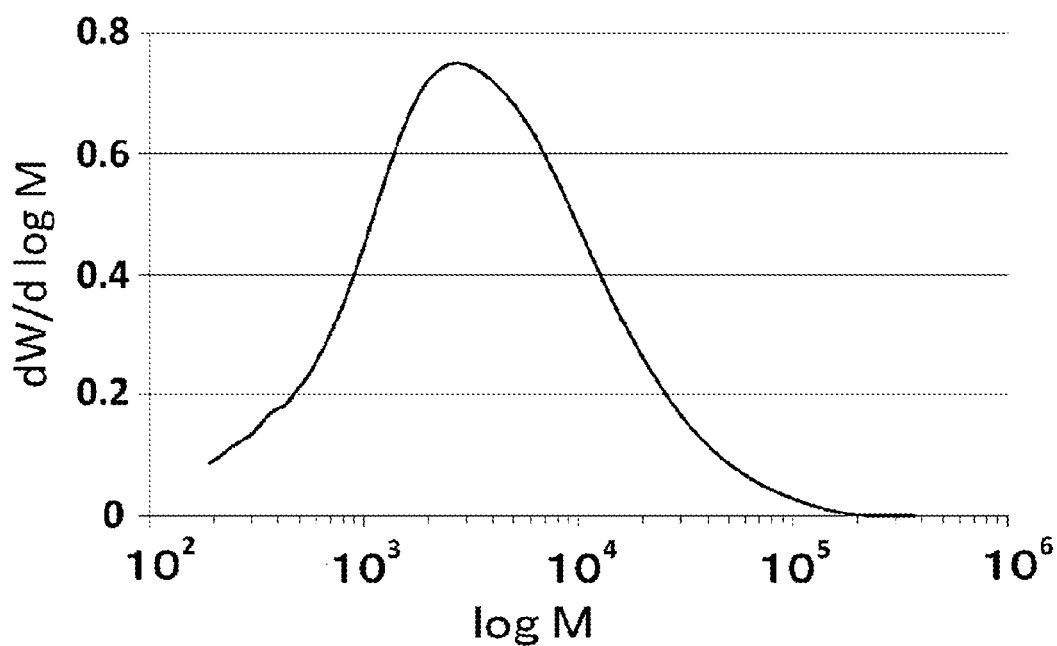
FIG. 2 is a characteristic diagram showing a molecular weight distribution obtained in an experiment using an analytical method according to an embodiment of the present invention.

Step 8: The analytical results of the sample X, which was the subject to be measured by the detector B, were converted with the calculated calibration curve, thereby obtaining the molecular weight distribution of the sample X (see FIG. 2).

As described above, according to embodiments of the present invention, since the first chromatogram of the second standard sample is obtained using the first detector, the second chromatogram of the solvent for the second standard sample is obtained using the first detector, and the third elution time of the second standard sample using the first detector is determined from the difference between the first chromatogram and the second chromatogram, an accurate calibration curve can be created using multiple detectors in size exclusion chromatography.

Note that the present invention is not limited to the embodiments described above, and it is apparent that those having ordinary skill in the art can make many modifications and combinations without departing from the technical spirit of the present invention.

The invention claimed is:

1. An analytical method comprising:
   obtaining a plurality of first elution times by analyzing a plurality of first standard samples each having a different molecular weight by size exclusion chromatography analysis using a first detector;
   obtaining a first chromatogram by analyzing a second standard sample by size exclusion chromatography analysis using the first detector, wherein the second standard sample is dissolved in a solvent, and the first chromatogram corresponds to the second standard sample;
   obtaining a second chromatogram by analyzing the solvent that the second standard sample is dissolved in by size exclusion chromatography analysis using the first detector, wherein the second chromatogram corresponds to the solvent;
   obtaining a second elution time by analyzing the second standard sample by size exclusion chromatography analysis using a second detector;
   determining a third elution time in size exclusion chromatography analysis of the second standard sample using the first detector, from a difference between the first chromatogram and the second chromatogram;
   determining a plurality of fourth elution times by adjusting each of the plurality of first elution times based on a difference between the second elution time and the third elution time;
   creating a calibration curve based on a relationship between the plurality of fourth elution times and corresponding molecular weights;
   obtaining a third chromatogram by analyzing a substance to be measured by size exclusion chromatography analysis using the second detector; and
   converting the third chromatogram using the calibration curve, thereby obtaining a molecular weight distribution of the substance.

2. The analytical method according to claim 1, wherein the first detector is a differential refractometer.

3. The analytical method according to claim 1, wherein the second standard sample has a ratio of a number average molecular weight to a weight average molecular weight of 1.30 or less.

4. The analytical method according to claim 1, wherein the second detector is an ultraviolet absorption detector.

5. The analytical method according to claim 1, wherein the first detector is a differential refractometer and the second detector is an ultraviolet absorption detector.

6. A method of creating a calibration curve, the method comprising:
   obtaining a plurality of first elution times by analyzing a plurality of first standard samples each having a different molecular weight by size exclusion chromatography analysis using a first detector;
   obtaining a first chromatogram by analyzing a second standard sample by size exclusion chromatography analysis using the first detector, wherein the second standard sample is dissolved in a solvent, and the first chromatogram corresponds to the second standard sample;
   obtaining a second chromatogram by analyzing the solvent that the second standard sample is dissolved in by size exclusion chromatography analysis using the first detector;
   obtaining a second elution time by analyzing the second standard sample by size exclusion chromatography analysis using a second detector, wherein the second chromatogram corresponds to the solvent;
   determining a third elution time in size exclusion chromatography analysis of the second standard sample using the first detector, from a difference between the first chromatogram and the second chromatogram;
   determining a plurality of fourth elution times by adjusting each of the plurality of first elution times based on a difference between the second elution time and the third elution time; and
   creating the calibration curve showing based on a relationship between the plurality of fourth elution times and corresponding molecular weights.

7. The method according to claim 6, wherein the first detector is a differential refractometer.

8. The method according to claim 6, wherein the second standard sample has a ratio of a number average molecular weight to a weight average molecular weight of 1.30 or less.

9. The method according to claim 6, wherein the second detector is an ultraviolet absorption detector.

10. The method according to claim 6, wherein the first detector is a differential refractometer and the second detector is an ultraviolet absorption detector.

11. The method according to claim 10, further comprising determining a molecular weight distribution of a substance to be measured using the calibration curve.

12. The method according to claim 11, wherein determining the molecular weight distribution of the substance to be measured comprises:
    obtaining a third chromatogram by analyzing the substance to be measured by size exclusion chromatography analysis using the second detector; and
    obtaining the molecular weight distribution of the substance by converting the third chromatogram using the calibration curve.

* * * * *